Hoe & Tucker. Sheet 1. 2 Sheets

Printing Press.

No. 3,735. Reissued Nov. 16, 1869.

Witnesses.

J. T. Crawford

Edward C. Ashton

Inventor.

Richard M. Hoe

Stephen D. Tucker

By Ex Dwight atty

Hoe & Tucker. Sheet 2, 2 Sheets.
Printing Press.

No. 3,755 Reissued Nov. 15, 1869.

Witnesses
J. P. Crawford
Edward C. Osborn

Inventor
Richard M. Hoe
Stephen D. Tucker
By Lea & Gregory Atty.

United States Patent Office.

RICHARD M. HOE AND STEPHEN D. TUCKER, OF NEW YORK, N. Y.

*Letters Patent No.* 92,050, *dated June* 29, 1869; *reissue No.* 3,735, *dated November* 16, 1869.

IMPROVEMENT IN PRINTING-PRESSES.

The Schedule referred to in these Letters Patent and making part of the same.

*To all whom it may concern:*

Be it known that we, RICHARD M. HOE and STEPHEN D. TUCKER, both of the city, county, and State of New York, have invented certain new and useful Improvements in Printing-Machines; and we do hereby declare the following to be a full, clear, and exact description of the construction and operation of the same, reference being had to the accompanying drawings, figures, and letters of reference thereon, in which—

Similar letters of reference indicate like parts in the several drawings.

Our invention consists—

Figure 1:
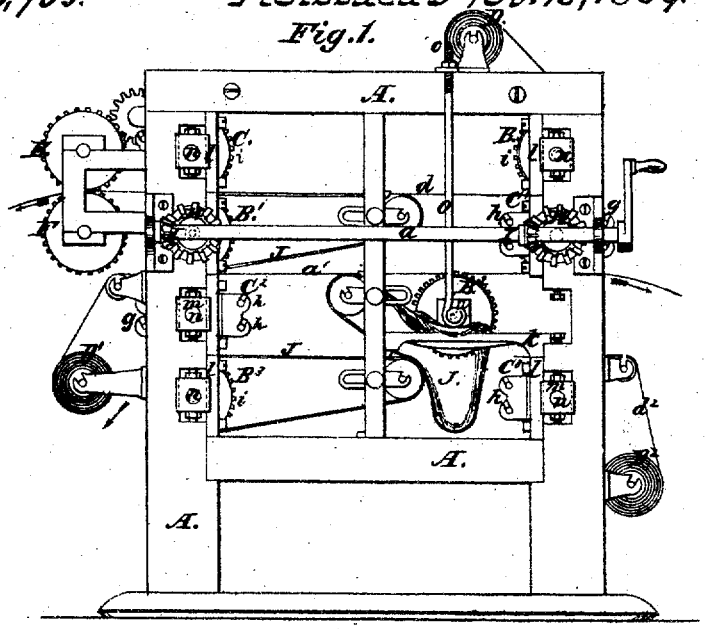
Figure 1 is a side elevation of our improved machine.
Figure 2:
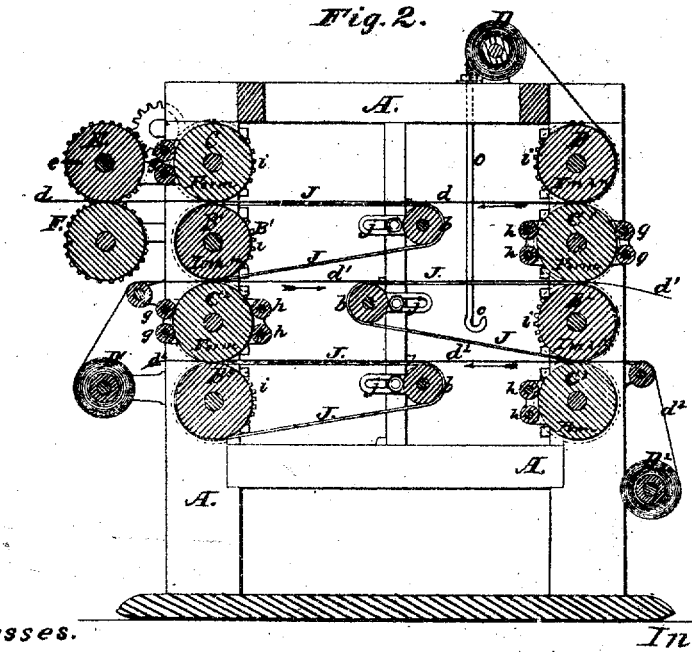
Figure 2 is a vertical sectional view.

First, in the combination and arrangement, in a printing-machine, of two series of alternating form-cylinders and impression-cylinders, with the necessary inking-apparatus, so that any desired number of rolls of paper or succession of separate sheets may be printed on both sides in passing once through the machine.

Second, in the arrangement of endless blankets for the impression-cylinders, in such a manner that they are made to perform the twofold duty of blankets and sheet-conveyers, thereby dispensing with the use of tapes for conveying the paper.

Third, in a mechanism for sustaining the cylinders while changing the forms or blankets.

To enable others skilled in the art to make and use our invention, we will describe the construction and operation of the same.

A represents the frame-work of the machine, so constructed as to properly hold and support the various operative parts.

In the sides of this frame are arranged suitable bearings *m m*, for the journals *n n* of the impression-cylinders B $B^1$ and form-cylinders C $C^1$.

The cylinders of each series are connected together by gear-wheels *i i i* secured on their journals, through the medium of which the proper movements are communicated to each cylinder.

On the ends of the journals of the cylinders $B^1$ $C^1$ are secured two bevel-gears H H, which are driven by the pinions I I on the shaft *a*, through which the necessary power is applied to operate the machine.

The form-cylinders C $C^1$ $C^2$ are provided with the necessary inking-apparatus *g g h h*, and the impression-cylinders B $B^1$ $B^2$ are furnished with travelling-blankets J J.

These blankets are made in the form of an endless band, of the same width as the cylinders around which they pass, and are held in proper position by the rollers *b b b*, which, furnished with adjustable bearings *j j*, hold the blankets at all times at the proper tension, and support and convey the paper to the next pair of cylinders.

Suitable bearings or supports for the rolls of paper D $D^1$ $D^2$ are arranged upon the frame, and proper mechanism, of a form similar to that now in use in printing-machines, is attached to and combined with the machine for each roll of paper, when rolls are used, for separating the sheets from the rolls as they are printed.

The machine being provided with the necessary attachments of sheet-fliers, receiving tables, inking-apparatus, &c., connection is made with the driving-power, and the operation proceeds as follows:

The sheet *d*, from the first roll, passes around the impression-cylinder B, and receives an impression on its under surface from the form-cylinder $C^1$ The sheet then passes through to the opposite set of cylinders, and receives the second impression on its upper surface from the form-cylinder C.

The second sheet $d^1$ at the same time receives an impression on its under surface from the form-cylinder $C^2$, and on its upper surface from the form-cylinder $C^1$, from which the under surface of the first sheet *d* is also printed.

Simultaneously with these operations, the third sheet $d^2$ is printed on its under surface from the form-cylinder $C^3$, and on its upper surface from the form-cylinder $C^2$.

The printed sheets, after being separated from the rolls by the cutting-mechanism, are laid upon the receiving-table by the sheet-fliers.

By this arrangement of the cylinders, it will be seen that the form-cylinders $C^1$ $C^2$ print the opposite sides of the separate sheets at the same time, and that the cylinders $B^1$ $B^2$ perform the office of impression-cylinders for the form-cylinders C $C^2$ $C^1$ $C^3$.

It will also be evident that by an addition of another impression-cylinder to the form-cylinder $C^3$, and of another form-cylinder to the impression-cylinder $B^3$, a fourth roll of paper may be printed upon, and so on, *ad libitum*.

The cylinders from which two sheets are imprinted at the same time are necessarily furnished with a second set of inking-rollers *h h*.

When it becomes necessary to change the blankets, the side of the frame *l* is removed, and the bar *k* placed in position, as shown in fig. 1.

The cylinder, with its journal-box *m*, is drawn out of the frame on to the bar *k*, and the blanket drawn from the cylinder over the end, and laid in folds on the bar, between it and the end of the journal *n*. The rod *o* is then attached to the end of the journal, and the cylinder is raised from the bar, by means of the nut on the end of the rod *o* sufficiently to allow of the bar being removed, so that by lifting one end of the roller *b* from its bearing, the blanket is drawn from the roller and quickly removed from the machine.

By proceeding with the operation in a reverse manner, a new blanket may be easily and expeditiously placed in position on the cylinder.

Figure 3:
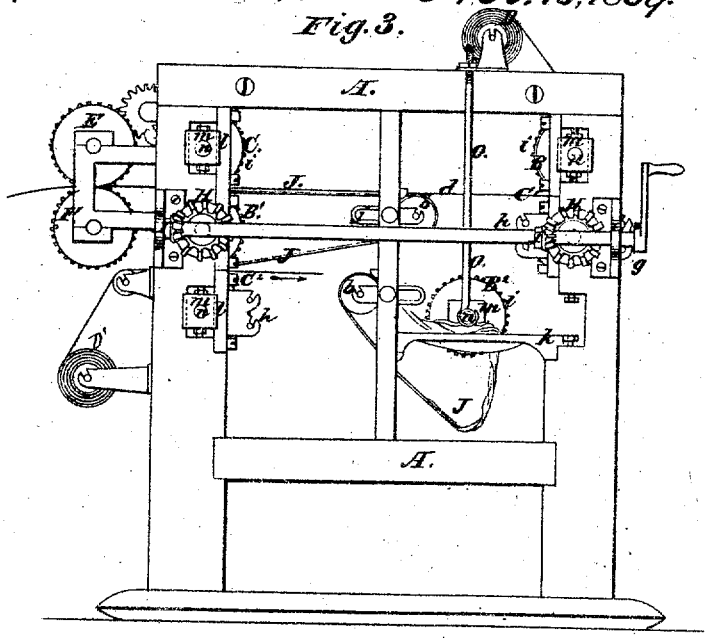
Figures 3 and 4 represent our machine as constructed with three cylinders in each series, the operation of which will be fully set forth hereafter.
Figure 4:
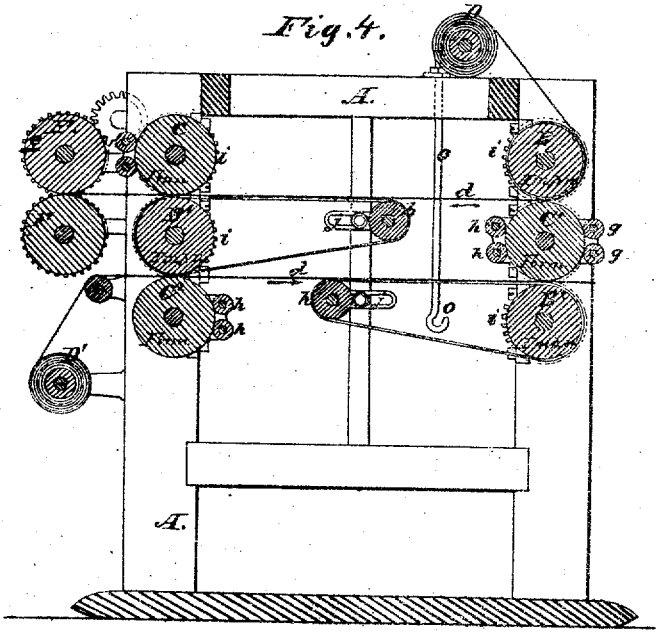

In constructing a machine with our improvements, we prefer to use the arrangement represented in figs. 3 and 4 of three cylinders in each series, the left hand, containing two form-cylinders C $C^2$ and one impression-cylinder $B^1$, and the right hand one form-cylinder $C^1$ and two impression-cylinders B $B^2$.

By this arrangement, the stereotype forms containing the principal part of the matter composing the paper, may be arranged upon the form-cylinders C $C^2$, from which one side of each sheet is printed, while the forms for the other side may be kept open as long as possible, in order to get in the latest news, such being the custom of all newspaper-printing offices; and as it is very important to get to press with the least delay possible, it will be readily seen that less time will be consumed in taking one stereotype and using one form to print the other side of each sheet than more.

Having thus fully described our invention,

What we claim, and desire to secure by Letters Patent, is—

1. The combination and arrangement, in a printing-machine, of two series of rollers, consisting of two printing-cylinders and one impression-cylinder, with two impression-cylinders and one printing-cylinder, with the requisite inking-machinery, arranged and operating substantially as and for the purposes set forth and specified.

2. Arranging the endless blankets for the impression-cylinders, as shown, whereby the same are made to perform the twofold duty of blankets and sheet-conveyers, thereby dispensing entirely with the use of tapes for conveying the sheets, substantially as described and specified.

3. The mechanism for sustaining the cylinder, for changing the form or blanket, consisting of the rod *o* and bar *k*, substantially as described and specified.

RICHD. M. HOE.
STEPHEN D. TUCKER.

Witnesses:
C. A. DURGIN,
EDWARD E. OSBORN.